United States Patent [19]

Kobayashi

[11] 4,379,530
[45] Apr. 12, 1983

[54] FISHING REEL

[75] Inventor: Takehiro Kobayashi, Fukuyama, Japan

[73] Assignee: Ryobi Limited, Fuchu, Japan

[21] Appl. No.: 183,768

[22] Filed: Sep. 3, 1980

[30] Foreign Application Priority Data

Sep. 3, 1979 [JP] Japan .......................... 54-122129[U]

[51] Int. Cl.³ ............................................. A01K 89/02
[52] U.S. Cl. .................................. 242/220; 192/67 R
[58] Field of Search ............... 242/220, 218, 211, 212, 242/213, 214, 216; 192/67 R, 93 A, 93 B

[56] References Cited

U.S. PATENT DOCUMENTS

| | | | |
|---|---|---|---|
| 1,939,148 | 12/1933 | Spenny | 242/220 |
| 2,652,991 | 9/1953 | Murvall | 242/220 |
| 3,916,715 | 11/1975 | Covey | 242/211 |
| 4,014,422 | 3/1977 | Morishita | 242/212 |
| 4,168,812 | 9/1979 | Karlsson | 242/220 |
| 4,281,808 | 8/1981 | Noda | 242/220 |

*Primary Examiner*—Billy S. Taylor
*Attorney, Agent, or Firm*—Birch, Stewart, Kolasch & Birch

[57] ABSTRACT

The present invention relates to a fishing reel of the type wherein a pinion forced to mesh with a main gear rotated by a handle is fitted on a main rod to be slidable in the axial direction. A clutch cam is disposed between a clutch lever secured to the pinion and a base plate so that coupling between the pinion and the main rod is disengaged by rotating the clutch cam. The pinion is caused to reengage the main rod when a ratchet wheel coaxial with the main gear is rotated. In addition, there is provided a kick lever interlocked with the clutch cam, a slider mounted on the base plate to be slid by the kick lever, and a kick plate pivotally mounted on the slider. One end of the kick plate engages the ratchet wheel, and a spring is provided for urging the kick plate to engage the ratchet wheel.

8 Claims, 3 Drawing Figures

FISHING REEL

BACKGROUND OF THE INVENTION

This invention relates to a fishing reel, more particularly a clutch mechanism for transmitting or non-transmitting a torque between a handle and a spool.

A clutch mechanism of this type is disclosed in U.S. Pat. No. 4,014,422 dated Mar. 29, 1977, in which a pinion meshing with a main gear rotated by a handle is fitted over a main rod to be slidable in the axial direction, a clutch cam is disposed between a clutch lever secured to the lever and a base plate so as to disengage the pinion from the main rod by rotating the clutch cam and to reengage the pinion and main rod by rotating a ratchet wheel which rotates coaxially with the main gear.

This prior art fishing reel, however, is constructed such that when the torque is non-transmitted, one end of the clutch cam is caused to directly engage between teeth of the ratchet wheel as the clutch cam is rotated, and when the torque is transmitted again the end is kicked as the ratchet is rotated to rotate a kickless clutch in the opposite direction. For this reason there is a tendency to cause a tightening phenomenon between the tips of the teeth and the aforementioned end. Since occurrence of such tightening phenomenon is proportional to the number of teeth of the ratchet wheel, it is necessary to reduce, as much as possible, the number of the ratchet teeth. This requires an increase in the angle of rotation of the ratchet wheel or the handle at the time of retransmitting the torque with the result that the operation becomes slow and it becomes impossible to quickly respond to the resistance of a fish.

SUMMARY OF THE INVENTION

Accordingly, it is an object of this invention to provide an improved fishing reel capable of smoothly and rapidly switching between transmission and non-transmission of a torque from a handle to a spool.

According to this invention, there is provided a fishing reel of the type wherein a pinion forced to engage with a main gear rotated by a handle is fitted on a main rod to be slidable in the axial direction, a clutch cam is disposed between a clutch lever secured to said pinion and a base plate so that coupling between the pinion and the main rod is disengaged by rotating the clutch cam. The pinion is caused to reengage the main rod when a ratchet wheel is coaxial with the main gear. A kick lever is provided which is interlocked with the clutch cam, a slider is mounted on the base plate to be slid by the kick lever, and a kick plate is pivotally mounted on the slider, one end of the kick plate engages the ratchet wheel, and means for urging the kick plate to engage the ratchet wheel.

DESCRIPTION OF THE PREFERRED EMBODIMENT

Figure 1:
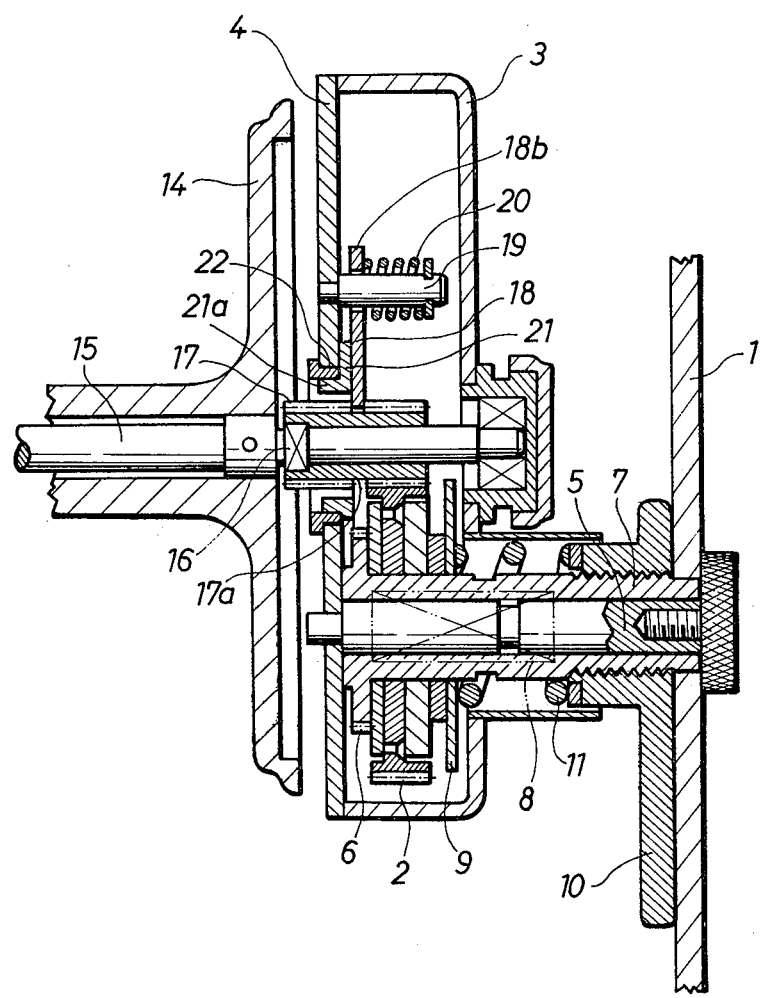
FIG. 1 is a longitudinal sectional view of a fishing reel embodying the invention.
Figure 2:
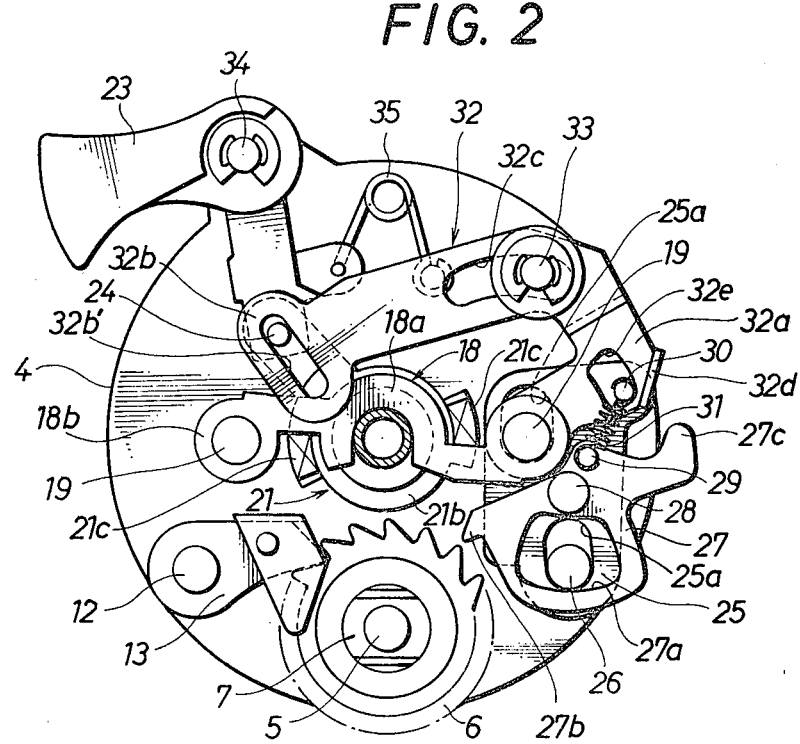
FIG. 2 is a front view showing various elements in a torque transmitting state and FIG. 3 is a front view similar to FIG. 2 but showing the various elements in a non-transmitting state.
Figure 3:
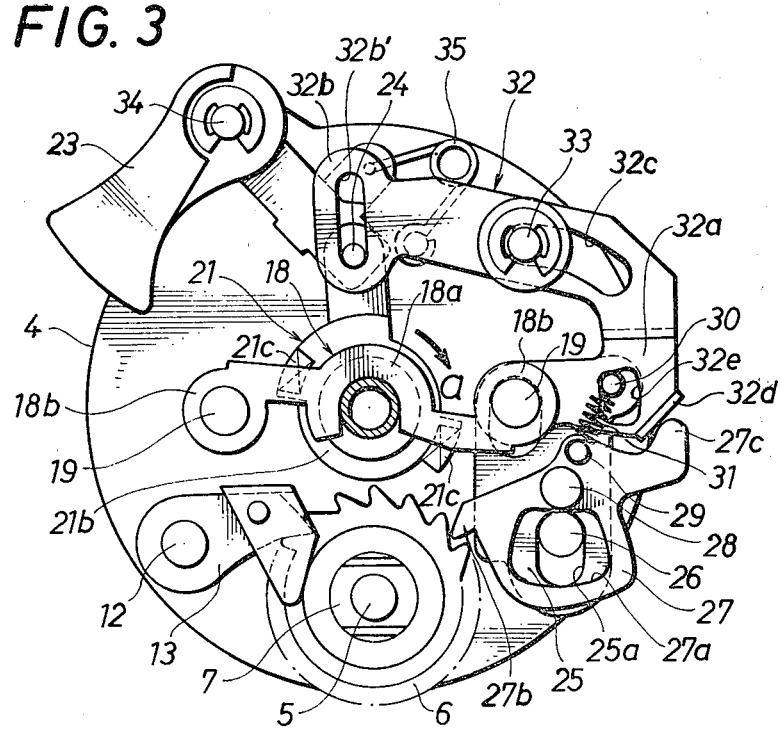

A preferred embodiment of this invention shown in FIGS. 1, 2 and 3 comprises a main gear 2 rotated by a handle 1, a base plate 4 and a cover 3 secured thereto. One end of a supporting shaft 5 is secured to the base plate 4 to rotatably support a hollow ratchet shaft 7 provided with an annular recess 8 on its inner surface. A compression spring 11 is interposed between a washer 9 rotatably mounted on the ratchet shaft 7 and a drag handle 10 threaded on the outer surface of the ratchet shaft 7. Thus, by rotating the drag handle 10 it is possible to adjust the friction between the washer 9 and the main gear 2 thereby controlling transmission, non-transmission of the torque or the amount thereof transmitted. In other words, these elements constitute a friction clutch. A reverse rotation is prevented by the pawl 13 which is pivotally mounted on the base plate 4 by a pin 12 which engages the periphery of the ratchet wheel. One end of a main rod 15 supporting a spool 14 is journalled in the cover 3. A pinion 17 is mounted on the main rod 15 to be slidable in the axial direction.

A coupling 16 is provided on one end of the main rod 15 so that when the pinion 17 is moved in the axial direction while engaging with the main gear 2 the coupling 16 couples the pinion 17 to the main rod 15. A clutch for engaging and disengaging the coupling 16 comprises a clutch lever 18 having a semicircular portion 18a and arms 18b radially extending outwardly from the semicircular portion in opposite directions. The outer ends of the arms 18b are connected to the base plate 4 through connecting pins 19 and are normally urged towards the base plate by springs 20. The semicircular portion 18a is received in an annular groove 17a provided for the pinion 17. The clutch further comprises a clutch cam 21 including a cylindrical portion 21a having an inner diameter larger than the outer diameter of the pinion 17, a flange 21b on the outer end of the cylindrical portion 21a and radially projecting cams 21c formed on the flange 21b. The cylindrical portion 21a is fitted, through a bushing, into an opening 22 provided for the base plate 4 which is concentric with the main rod. The clutch cam 21 is connected by a pin 24 to one end 23 of an operating lever 23 and is rotatably pivoted to the cover 3 or the base plate 4.

The length of the cams 21c above the surface of flange 21b is slightly longer than that of the coupling 16 so that when the clutch cam 21 is rotated by the operating lever 23 so as to release the pinion 17 from the main rod 15, the clutch lever 18 is moved against the force of the springs 20.

According to this invention, there is added a slider 25 connected to the pin 19 and a pin 26 secured to the base plate 4 through slots 25a to be movable in the vertical direction. A kick member 27 is rotatably mounted on the slider 25 through a pin 28. A pawl 27b at one end of the kick member 27 is resiliently urged against the ratchet wheel 6 by a spring 31 provided between pin 29 affixed to the kick member 27 and the pin 30 projecting from the slider 25. One end 32a of a fishing hook shaped kick lever 32 is pivotally connected to the clutch lever 18 through the pin 19, while the other end 32b is provided with a slot 32b' to receive the pin 24 to which the clutch cam 21 and the operating lever 23 are pivotally connected. A slot 32c is provided for the kick lever 32 near the other end to slidably receive a guide pin 33 secured to the base plate 4 so as to perform a predetermined operation as will be described later. A receiving member 32d is provided for the base portion of the end 32a to be urged by an abutting member 27c projecting from the kick member 27. This end 32a is also formed with a slot 32e to receive the pin 30 projecting from the slider 25, the pin 30 anchors one end of the spring 31.

The operating lever 23 has an L shaped side surface and the bent portion thereof is pivotally connected to the base plate 4 through a pin 34. The inner end of the operating member 23 is connected to the clutch cam 21 and the end 32b of the kick lever 35 to be snapped by a hair pin shaped spring 35.

It should be noted that the number of the teeth of the ratchet wheel is larger than that of the prior art.

When the operating lever 23 is not depressed as shown in FIG. 2, the cams 21c of the clutch cam 21 do not interfer with the clutch lever 18 so that the clutch lever 18 is urged towards the base plate 4 by the action of springs 20. Consequently, the pinion 17 is coupled to the main rod 15 through a coupler 16, thus transmitting the torque to the spool 14. Thus, the spool 14 is rotated by the handle 1 to take up a fishing line.

At this time, the kick lever 32 is rotated in the counterclockwise direction about pin 19 so that its lefthand end 32b is moved until pin 24 engages the upper end of the slot 32b'. Consequently, pin 30 of slider 25 engaging the slot 32e is raised to shift upwardly the slider 25 together with the kick member 27 and the pawl 27b thereof is held at a position not interfering with the teeth of the ratchet wheel 6.

When the operating lever 23 is pushed down from the position shown in FIG. 2, it is rotated in the counterclockwise direction about pin 34 against the force of the spring 35. When the dead center of the spring is passed slightly the operating lever 23 is snapped to the position shown in FIG. 3. At this time, clutch cam 21 is rotated in a direction shown by an arrow a in FIG. 3 to bring cams 21c to the rear side of the arms 18b of the clutch lever so as to move the clutch lever 18 together with the pinion towards right as viewed in FIG. 1 against the force of the springs 20 by a distance corresponding to the height of the cam. As a consequence, the pinion 17 is disengaged from the coupling 16 thus releasing the main rod 15 and the pinion 17. This is a state in which the torque of the handle is not transmitted to the spool 14. At this time, the kick lever 32 is rotated in the clockwise direction about the pin 19 by the rotation of the operating lever 23, the extent of rotation being limited by the length of the slot 32c. Consequently, the pin 30 is pushed down by slot 32e so that the slider 25 is slid downwardly together with the kick member 27 until the pawl 27b engages the ratchet wheel 6. The kick member 27 is provided with a window 27a so that it can rotate without interferring with pin 26 carrying the slider 25. Accordingly, the kick member 27 can rotate under the force of the spring 31.

Under the non-transmitting state described above, the spool 14 is free to rotate, thus when tension is applied to the fishing line by a hooked fish or weight the already taken up string can be freely paid out.

When the handle 1 is rotated in the positive direction, the pawl 27b is pushed down by the rotation of the ratchet wheel 16 so that the kick member 27 is rotated in the counterclockwise direction about pin 28 against the tension of spring 31. At this time, since the engaging member 27c raises the receiving member 32d, the kick lever 32 rotates in the counterclockwise direction about pin 11 thus moving the end 32b towards the left and rotating the operating lever 23 in the clockwise direction. Consequently, the clutch cam 21 is rotated in a direction opposite to arrow a so that cams 21c are moved out from the rear side of the arms 18b of the clutch lever 18. As a consequence, the clutch lever 18 is moved towards the base plate 4 together with the pinion 17 by the force of the spring 20 so that the pinion engages the coupler 16 to be coupled with the main rod 15, thus rapidly establishing the torque transmitting state.

As above described, with the clutch according to this invention, the transmitting and non-transmitting states of the torque from the handle to the spool can be quickly switched by pushing the operating lever and rotating the handle 1 in the position direction. More particularly, according to this invention, the kick member 27 is caused to engage the ratchet wheel for switching the state from non-transmitting to transmitting state by the positive rotation of the handle which is pivotally connected to the slider 25 which is mounted on the base plate 4 to be slidable in the vertical direction, and the kick member 27 and the slider 25 are operatively connected with the kick lever 32 interlocked with the operating lever 23 and the clutch cam 21 so that when the state is switched between torque transmission and non-transmission, the kick pawl 27 can move with the slider 25 in the vertical direction with respect to the ratchet wheel 6. Consequently, there is no fear of causing any tightening phenomenon between the teeth of the ratchet wheel and the pawl 27b, thus making smooth and accurate the switching between torque transmission and non-transmission states and avoiding damage of the ratchet wheel. Consequently, the teeth of the ratchet wheel can engage the pawl 27b in any position. This enables an increase in the number of teeth of the ratchet wheel which not only makes the angle of positive rotation of the handle smaller at the time of switching but also makes the switching operation at the time of fishing quicker.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fishing reel comprising:
    a base plate;
    a main rod;
    means for rotatably mounting said main rod relative to said base plate;
    a handle;
    a supporting shaft;
    means for affixing said handle to said supporting shaft;
    means for rotatably mounting said support shaft relative to said base plate;
    a main gear;
    means for affixing said main gear to rotate in unison with said supporting shaft;
    a pinion;
    means for slidably mounting said pinion in an axial direction on said main rod, said pinion being normally forced to mesh with said main gear;
    a clutch lever;

means for mounting said clutch lever relative to said base plate to permit limited axial movement relative to said main rod;
means for affixing said clutch lever to said pinion;
a clutch cam;
means for rotatably mounting said clutch cam relative to said base plate;
a kick lever;
means for interlocking said kick lever with said clutch cam;
a slider;
means for slidably mounting said slider on said base plate;
means for attaching said kick lever to said slider wherein movement of said kick lever imparting a sliding movement to said slider;
a kick plate;
means for pivotally mounting said kick plate on said slider;
a ratchet wheel;
means for affixing said ratchet wheel to said support shaft, said ratchet wheel being coaxially mounted on said support shaft relative to said main gear;
said kick plate including a first end being selectively, operatively engageable with said ratchet wheel;
said kick lever being movable in a first direction to impart rotary motion to said clutch cam to axially move said clutch lever and said pinion to disengage said pinion from said main gear, movement of said kick lever in said first direction imparts sliding motion to said slider to position said first end of said kick plate into operative engagement with said ratchet wheel, subsequent rotation of said handle imparts rotary movement to said support shaft and said ratchet wheel to impart a rotary movement to said first end of said kick plate to slide said slider and impart movement to said kick lever to rotate said clutch cam to axially move said clutch lever and said pinion to reengage said pinion with said main gear.

2. The fishing reel according to claim 1 wherein an abutting member is formed on the other end of said kick plate to oppose a bent portion of said kick lever.

3. The fishing reel according to claim 1 wherein said kick lever is provided with an opening for receiving a pin mounted on said slider to permit a lost-motion movement between said kick lever and said slider.

4. The fishing reel according to claim 3 wherein a spring is interposed between said pin on said slider and a pin mounted on said kick plate so as to urge a pawl at said first end of said kick plate to engage said ratchet wheel.

5. The fishing reel according to claim 1 wherein said kick lever includes a slot for receiving a guide pin secured to said base plate for guiding the movement of said kick lever.

6. The fishing reel according to claim 1, wherein an operating lever is operatively connected to said kick lever to actuate said clutch lever to disengage said pinion from said main rod when said operating lever is depressed.

7. The fishing reel according to claim 1, wherein said slider includes openings therein and pins affixed to said base plate projecting upwardly through said openings for limiting the movement of said slider.

8. The fishing reel according to claim 1, wherein said means for mounting said clutch lever includes projecting pins affixed to said base plate to permit axially displacement of said clutch lever and said pinion with respect to said main rod when said clutch lever is actuated.

* * * * *